United States Patent [19]
Richards

[11] Patent Number: 5,553,494
[45] Date of Patent: Sep. 10, 1996

[54] FLUID LEVEL SENSING SYSTEMS

[75] Inventor: Paul N. Richards, Basingstoke, England

[73] Assignee: Solartron Group Limited, England

[21] Appl. No.: 250,007

[22] Filed: May 27, 1994

[30] Foreign Application Priority Data

May 29, 1993 [GB] United Kingdom ............... 9311187

[51] Int. Cl.$^6$ ..................................... G01F 23/00
[52] U.S. Cl. ........................ 73/304 R; 340/620
[58] Field of Search ............ 73/304 R; 340/618, 340/620

[56] References Cited

U.S. PATENT DOCUMENTS

| | | | |
|---|---|---|---|
| 3,370,466 | 2/1968 | Chang | 73/304 R |
| 3,443,438 | 5/1969 | Martin et al. | 73/304 R |
| 4,020,488 | 4/1977 | Martin et al. | |
| 4,371,790 | 2/1983 | Manning et al. | |
| 4,382,382 | 5/1983 | Wang | |
| 4,720,997 | 1/1988 | Doak et al. | 73/304 R |
| 4,903,530 | 2/1990 | Hull | 73/304 R |
| 5,035,139 | 7/1991 | Hoefelmayr et al. | 73/304 R |
| 5,263,370 | 11/1993 | Murata et al. | 73/304 R |

FOREIGN PATENT DOCUMENTS

| | | |
|---|---|---|
| 0447810A3 | 9/1991 | European Pat. Off. |
| 1056032 | 1/1967 | United Kingdom . |
| 1600329 | 10/1981 | United Kingdom . |
| 2097932 | 11/1982 | United Kingdom ............... 73/304 R |
| 2158948 | 11/1985 | United Kingdom . |
| WO9300573 | 1/1993 | WIPO . |

OTHER PUBLICATIONS

Walton, *Rev. Sci. Instrum.* 51(4), Apr. 1980, New York, US. "Sensor for the Measurement of the Level and Volume of Conductive Liquids", pp. 504–508.

*Primary Examiner*—William A. Cuchlinski, Jr.
*Assistant Examiner*—Andrew Hirshfeld
*Attorney, Agent, or Firm*—Lerner, David, Littenberg, Krumholz & Mentlik

[57] ABSTRACT

A boiler water level system comprises a plurality of electrodes arranged to sense the resistivity of the fluid at each of a plurality of different levels in a pressure vessel. The pressure vessel is coupled to one end of the boiler such that the level of the water in the pressure vessel is substantially the same as the level in the boiler, and each electrode senses the resistivity of the fluid (ie water or steam) between the tip of the electrode and the wall of the pressure vessel. Such a system on its own inherently produces a digital output of relatively low resolution, so to improve resolution, and to provide an analogue output if desired, additional circuitry is provided to sense the progressive change in the impedance sensed by each electrode as the water rises to progressively immerse that electrode and then carries on rising towards the next electrode.

10 Claims, 3 Drawing Sheets

FLUID LEVEL SENSING SYSTEMS

This invention relates to fluid level sensing systems, and is more particularly but not exclusively concerned with boiler water level sensing systems of the general kind disclosed in United Kingdom Patents Nos 1 056 032 and 1 438 271.

Boiler water level sensing systems of the kind described in United Kingdom Patents Nos 1 056 032 and 1 438 271 typically comprise a vertically extending cylindrical pressure vessel, sometimes called a "water column", adapted to be connected near its top and near its bottom to one end of a boiler, such that the water level in the pressure vessel is substantially the same as the water level in the boiler. A plurality of vertically spaced electrodes sealingly project into the pressure vessel, and are used to sense the electrical impedance of the fluid in the pressure vessel at the respective level of each electrode. Since the minimum electrical impedance of steam is significantly greater than the maximum electrical impedance of water, the position of the water/steam interface can readily be established. Systems of this kind are currently commercialised by the Applicant under the trade mark HYDRASTEP.

Although this known kind of system is extremely reliable and works well when used to provide a visual display of water level, its output varies in a relatively small number of discrete steps, typically 12 to 16, corresponding to the number of spaced sensors typically employed in such systems. This is well suited to providing a correspondingly stepped visual display, but is less well suited to control applications, for which an output of considerably greater resolution, preferably a continuous or analogue output, would be more suitable. It is an object of the present invention to alleviate this drawback.

According to the present invention there is provided a fluid level sensing system for sensing the level of the interface between a first fluid and a second fluid, the first fluid being beneath and of lower electrical impedance than the second fluid, the system comprising an electrically conductive vessel for containing the fluids and a plurality of vertically spaced sensors each of which has a sensing portion which projects into and is electrically insulated from the vessel and which is arranged, in use, to produce a signal representative of the impedance of the fluid between the sensing portion and the vessel, further comprising output means responsive to said impedance-representative signals for producing a first signal which is dependent upon the ratio between the impedance sensed by the sensor at or immediately below said interface and a value for the impedance of the first fluid derived from at least one sensor below the sensor at or immediately below said interface, and for combining said first signal with a second signal dependent upon the level of the sensor at or immediately below said interface so as to produce an output signal representative of the level of said interface within the vessel.

Thus the system effectively interpolates between adjacent sensors using the changing impedance sensed by the sensor at the interface as the interface rises to progressively immerse the sensing portion of that sensor in the first fluid and then rises further to progressively increase the area of the path in the first fluid between the sensing portion of that sensor and the vessel. This interpolation is compensated for variations in the impedance of the first fluid by using as a reference a value for the impedance of the first fluid derived from the impedance sensed by at least one sensor below the interface sensor, ie a sensor which is totally immersed in the first fluid. Preferably, this reference is derived by extrapolation from several totally immersed sensors, ideally the ones immediately beneath the interface sensor.

In a preferred embodiment of the invention, the system comprises a respective reference impedance for each sensor, and at least one reference signal source for applying an AC reference signal via each reference impedance to the sensing portion of the sensor associated with that reference impedance, whereby the reference impedance and the fluid between the sensing portion of the associated sensor and the vessel form a potential divider.

The output means preferably comprises at least one analogue-to-digital converter for converting the impedance-representative signal derived from the sensor at or immediately below said interface into a corresponding digital signal, and a microprocessor arranged to receive the digital signal and to produce said first signal therefrom. Thus the system may comprise a respective analogue-to-digital converter associated with each of said sensors. Alternatively, the system may comprise one analogue-to-digital converter and multiplexing means for multiplexing the analogue-to-digital converter between the sensors on a time multiplexed basis, or two analogue-to-digital converters, first multiplexing means for multiplexing one analogue-to-digital converter between the sensors of a first group of sensors on a time multiplexed basis, and second multiplexing means for multiplexing the other analogue-to-digital converter between the remaining sensors on a time multiplexed basis, the sensors of the first group comprising every alternate one of the vertically spaced sensors.

Conveniently, the microprocessor is further arranged to produce said second signal and to sum it with said first signal, the resulting summed signal being applied to a digital-to-analogue converter so as to produce said output signal in analogue form.

The reference impedances, the or each reference signal source, the or each analogue-to-digital converter, the or each microprocessor, the or each digital-to-analogue converter and the multiplexing means (if present) are preferably disposed in a housing remote from the sensors.

The invention will now be described, by way of example only, with reference to the accompanying drawings, of which:

Figure 1:
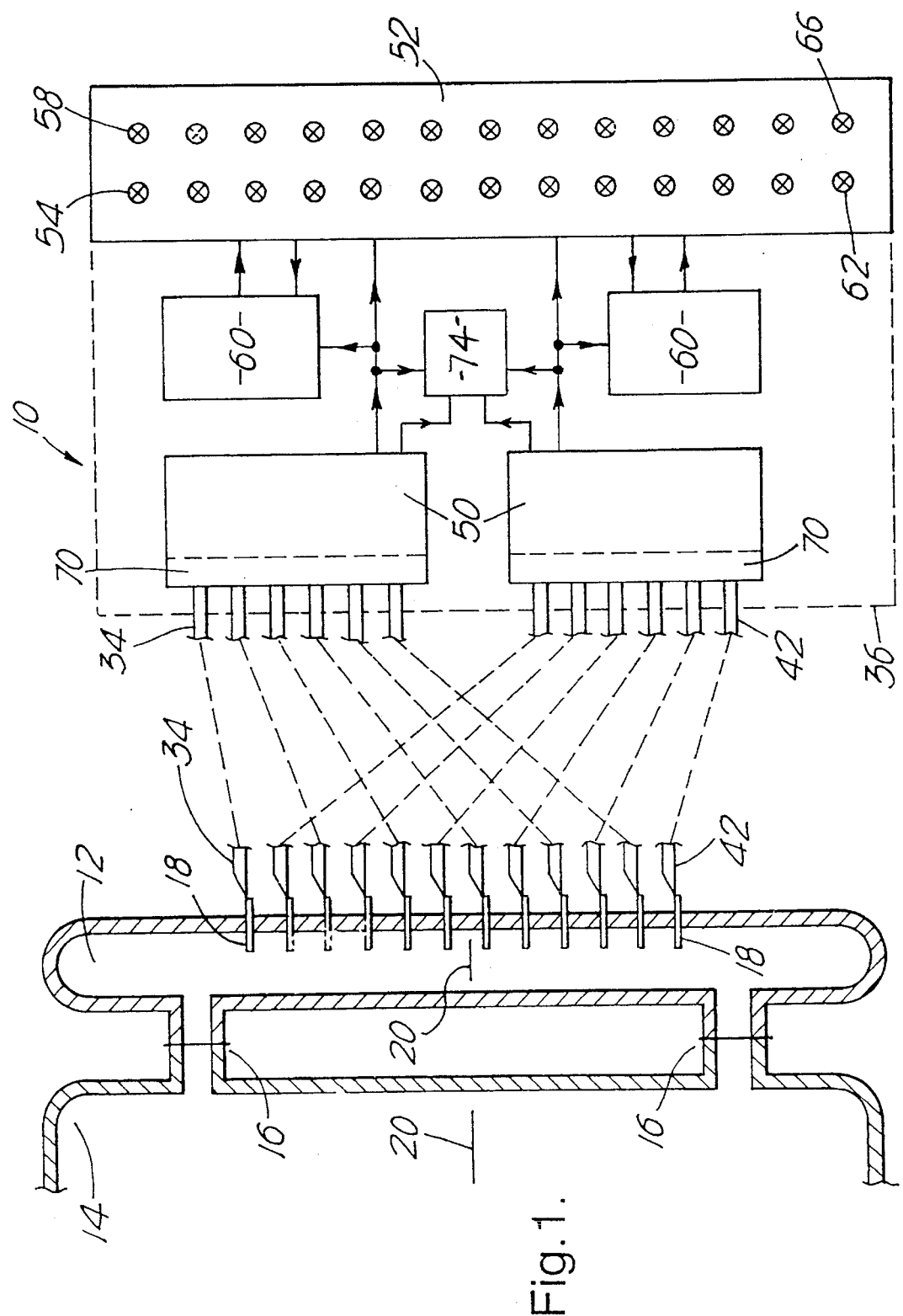
FIG. 1 is a schematic block diagram of a boiler water level sensing system in accordance with the present invention.

The boiler water level sensing system shown in FIG. 1 is indicated generally at 10, and comprises an elongate cylindrical steel pressure vessel 12 which in use is coupled to one end of a boiler 14 by upper and lower pipe couplings 16 adjacent the top and bottom respectively of the vessel, so that the water level in the vessel is substantially the same as the water level in the boiler. A plurality of vertically-spaced electrodes 18, typically twelve, project sealingly into the pressure vessel 12 between the couplings 16, the electrodes being substantially symmetrically distributed above and below the normal water level 20 in the vessel (which is of course substantially the same as the normal water level in the boiler 14). The couplings 16 typically include shut-off cocks and drain valves (not shown) to facilitate removal of the electrodes 18 from the pressure vessel 12 for maintenance and/or replacement.

Figure 2:
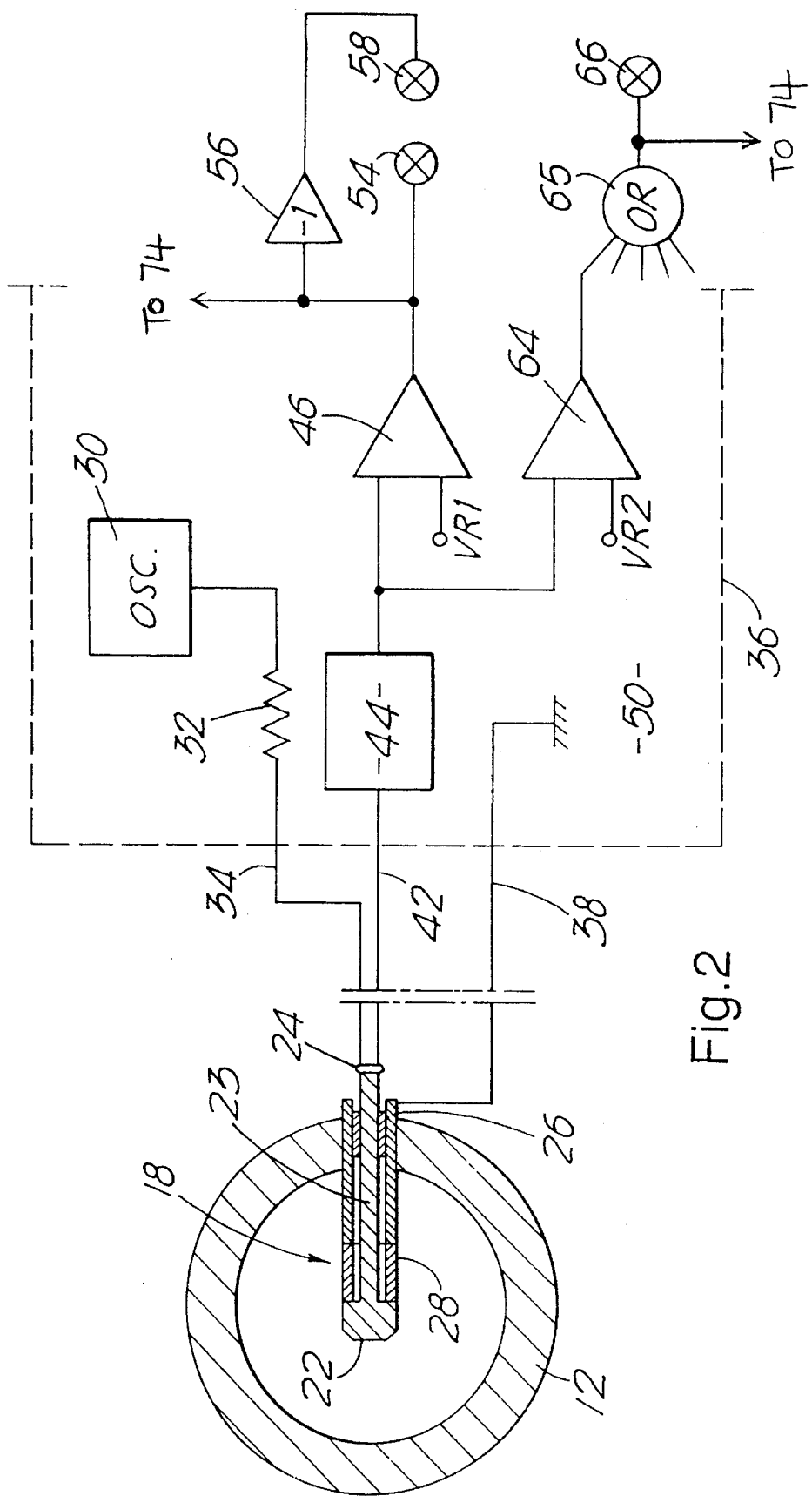
FIG. 2 is a somewhat diagrammatic, part sectional, view of part of the boiler water level sensing system of FIG. 1.

Each electrode 18 may be substantially as described in our United Kingdom Patent No 2 173 138, and as best seen in FIG. 2 comprises a sensing portion or tip 22 electrically connected to a terminal 24 outside the pressure vessel 12 by means of a conductor 23 extending coaxially through the body 26 of the electrode. The sensing tip 22 and the coaxial conductor 23 are electrically isolated from the body 26 of the electrode by an annular space and an annular ceramic insulator 28, the latter also serving to secure the sensing tip to the body. The insulator 28 defines a sensing gap between the sensing tip 22 and the body 26 of the electrode 18 and the pressure vessel 12, which gap is bridged in use by the fluid (water or steam) inside the pressure vessel 12 at the level of the electrode. Since the minimum electrical impedance or resistance of steam is substantially greater than the maximum electrical impedance or resistance of water, sensing the electrical impedance of the fluid bridging the sensing gap of the electrode 18 provides an indication of whether the electrode is immersed in water or in steam.

To sense the electrical impedance of the fluid bridging the sensing gap of the electrode 18, an alternating signal produced by an oscillator 30 is applied via a drive resistor 32 and a first wire 34 to the terminal 24 of the electrode 18. The oscillator 30 and the drive resistor 32 are disposed in a circuit housing or cabinet 36 which can be up to thirty meters away from the pressure vessel 12 and the boiler 14, since the immediate vicinity of the boiler represents a fairly harsh environment. A return or ground wire 38 connects the ground or zero volt power supply rail of the oscillator 30 and the other circuitry in the cabinet 36 to the pressure vessel 12 and thus to the body 26 of the electrode 18.

It will be appreciated that the drive resistor 32 and the impedance of the fluid bridging the sensing gap of the electrode 18 together form a voltage divider, so that the alternating voltage at the terminal 24 is representative of the fluid impedance at the sensing gap of the electrode 18. This alternating voltage is applied via a further wire 42 to a rectifying amplifier 44 in the cabinet 36. The rectifying amplifier 44 therefore produces a DC output voltage V whose amplitude is substantially proportional to the impedance sensed by the electrode 18, and this DC output signal is applied to one input of a first comparator 46. The other input of the comparator 46 is connected to receive a first reference voltage VR1, whose level is selected to lie about midway between the respective amplitudes of the DC output voltages produced by the rectifying amplifier 44 corresponding to the minimum sensed impedance of steam and to the maximum sensed impedance of water. Thus if the electrode 18 is immersed in steam, the output of the comparator 46 is at one level, typically logic 0, while if the electrode 18 is immersed in water, the output of the comparator 46 switches to its other level, ie logic 1.

Each of the twelve electrodes 18 is connected to its own channel of impedance measuring (or discrimination) circuitry comprising circuit elements identical to the elements 32, 34, 38, 42, 44 and 46: this discrimination circuitry is collectively indicated at 50 in FIG. 1. Additionally, the electrodes 18 are normally divided into two vertically interleaved groups of six, ie containing odd and even numbered electrodes respectively, with each group having a respective common oscillator 30 and a respective common power supply (not shown): thus if one power supply or oscillator fails, the other group of electrodes and their discrimination circuitry 50 continue to operate to provide level sensing, albeit with reduced resolution.

The comparators 46 within the discrimination circuitry 50 drive a display 52 comprising twelve pairs of adjacent, horizontally aligned, indicator lights, typically LEDs, arranged to form two parallel vertical rows, one red, representing steam, and one green, representing water. To this end, and as shown in FIG. 2, the output of each comparator 46 is connected to its green (water) light 54, and via an inverter 56 to its red (steam) light 58: typically these connections may include suitable drive amplifiers, but these have been omitted for the sake of simplicity. Thus a typical normal indication provided by the display 52 would have the top six red lights on, and the bottom six green lights on, indicating that the water in the boiler 14 is at its normal level.

Clearly, if a green light comes on above a red light which is on, implying water above steam, a fault condition exists (and is in fact apparent from the green-above-red indication of display 52). However, to back this up, the outputs of the discrimination circuitry 50 are connected to validation circuitry 60, generally similar or analogous to that described in our United Kingdom Patent No 1 056 032, which operates a fault indicator light 62 in the display 52 if any one of the electrodes 18 appear to be sensing water above steam. To assist in this "water above steam" determination, the two sets of validation circuitry are cross-coupled with each other via the display 52.

In addition to the fault detection provided by the "water above steam" validation circuitry 60, the boiler water level sensing system 10 is provided with further fault detection circuitry which operates when the resistance sensed by an electrode 18 falls below a given level. Thus the Applicant's observations have shown that the minimum resistance of water, as sensed by the electrode 18, is about 5 kilohms, so that a sensed resistance significantly lower than this is likely to be indicative of a fault. Accordingly, the DC output voltage V of each rectifying amplifier 44 is applied to one input of a respective second comparator 64, whose other input is connected to receive a second reference voltage VR2 selected to be equivalent to a sensed impedance of about 3 kilohms, as represented by the DC voltage produced by the rectifying amplifier 44. The comparator 64 thus produces a logic 0 output signal if its electrode 18 is immersed in water or steam, and a logic 1 output signal if the DC output signal produced by the rectifying amplifier 44 falls below VR2. The logic 1 output signals are operative, via respective OR gates 65 associated with the odd and even numbered electrode channels, to operate another fault indicator light 66 in the display 52.

The provision in each sensing channel of the second comparator 64, in combination with the use of the respective wires 34, 42 to connect the drive resistor 32 to the terminal 24 of the electrode 18, and the terminal 24 back to the rectifying amplifier 44 (instead of using just a single wire between the terminal 24 and a common terminal in the cabinet 36 connected both to the drive resistor 32 and to the rectifying amplifier 44), has the result that several different faults are rendered detectable. Thus each second comparator 64 will operate the fault indicator light 66 in the display 52 if either of its associated wires 34, 42 breaks or is short-circuited to ground (since both of these faults result in no output voltage from the rectifying amplifier 44), or if the sensing gap of an electrode 18 is short-circuited, eg by a build-up of an electrically conductive deposit on the ceramic insulator 28 (which again results in no output voltage from the rectifying amplifier 44). In addition, this wide range of fault detection is provided without requiring different wiring or circuit arrangements for steam-normal and water-normal electrodes, ie all twelve channels are substantially identical.

A number of modifications can be made to the embodiment of the system 10 as so far described. For example, relay logic can be used in place of electronic logic, and displays other than that specifically described can be used. Also, there can be more electrodes 18 than twelve, typically up to sixteen, or less than twelve: in the latter case, the electrodes need not be divided into two interleaved groups, so only one set of discrimination circuitry 50 and validation circuitry 60 is employed.

A further significant modification which can be made to the system 10 involves multiplexing. Thus the or each set of discrimination circuitry 50 can comprise a single channel of elements identical to the elements 44, 46 and 64, with a multiplexer at the input to the circuitry for sequentially connecting the input of the rectifying amplifier 44 to each of the associated electrodes in turn, ie on a time multiplexed basis; such multiplexers are indicated at 70 in FIG. 1. A demultiplexer (not shown), synchronised with the multiplexer 70 and located within the display 52, connects the respective outputs of the comparators 46 and 64 to respective latches or other memory devices, also forming part of the display 52, which are arranged to operate the indicator lights 52, 58 of the display and to provide the aforementioned cross-coupled connections between the two sets of validation circuitry.

The system 10 as described so far provides a relatively low resolution digital output signal suitable for driving the display 52. However, by virtue of its low resolution and stepped nature, this signal is not always suitable for control purposes, eg for controlling a feedwater pump to maintain the level of the water in the boiler 14 substantially constant. To overcome this problem, a high resolution output signal is provided by circuitry indicated at 74 in FIG. 1, and shown in more detail in FIG. 3.

Thus as the water in the pressure vessel 12 rises and first contacts a given electrode 18, the sensing gap defined by the insulator 28 of that electrode starts to be bridged by the water and the impedance sensed by that electrode starts to fall from its very high, steam, value. As the water continues to rise, this fall in the sensed impedance continues (albeit non-linearly) as the given electrode 18 is progressively immersed in the water. However, even after the given electrode 18 is completely immersed, the impedance sensed by it continues to fall (albeit more slowly) as the water rises towards the next electrode, since the rising water level increases the area of the path in the water from the sensing tip 22 of the just-immersed electrode to the pressure vessel 12 (which being directly electrically connected to the body 26 of every electrode 18 effectively forms the earth or zero volt reference of the entire system).

Figure 3:
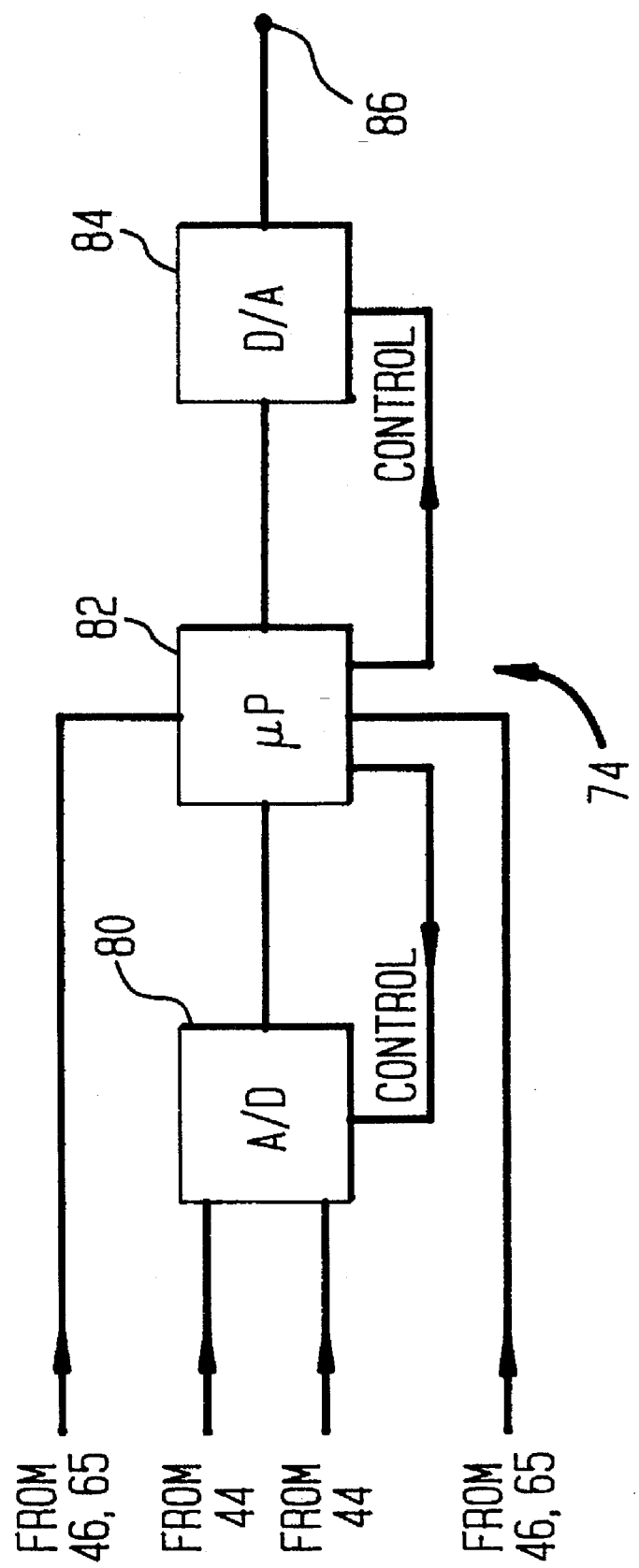
FIG. 3 is a slightly more detailed block diagram of one of the circuits of the system of FIG. 1.

This progressively changing sensed impedance is processed by the circuitry 74 of FIG. 3, which comprises a dual input analogue-to-digital converter 80 arranged to successively receive as inputs the respective time multiplexed voltages produced by the rectifying amplifiers 44 for each electrode 18 in turn, and to convert them into corresponding digital signals: to this end, the analogue to digital converter 80 operates at twice the frequency of the multiplexers 70. The digital signals are applied to a microprocessor 82, which also receives as inputs the signals produced by the comparators 46 and the OR gates 65 in order to enable it to determine which electrodes 18 are fully immersed in water, which electrodes are fully in steam, and therefore which electrode is at or immediately beneath the interface between the water and the steam in the pressure vessel 12. In dependence upon this determination, the microprocessor 82 stores the respective digital signals derived from the electrode 18 at or immediately beneath the steam/water interface and several of the electrodes immediately beneath that electrode. The microprocessor 82 first calculates, by extrapolation from the respective signals derived from the several electrodes 18 immediately beneath the interface electrode, the impedance of the water at the level of the interface electrode (this calculation is effected because the impedance of the water can vary considerably, not only with boiler operating conditions such as temperature and pressure, but even with height within the pressure vessel 12), and then calculates the ratio between the impedance actually sensed at the interface electrode and this calculated water impedance. Next, the microprocessor 82 effectively compares the value of this ratio with values previously stored in a look-up table (typically a ROM) and equating impedance ratio to the level above the bottom of the electrode 18 at or immediately beneath the steam/water interface, and produces a first signal representative of that level (i.e., the extra height of the water level just above the interface electrode). In other words, the impedance ratio is taken to the look-up table to obtain the extra height of the water level just above the interface electrode. Finally, the microprocessor 82 adds the first signal to a second signal representative of the level of the bottom of the electrode 18 at or immediately beneath the steam/water interface (i.e., the known height of the interface electrode), to produce a digital output signal representative of the level of the steam/water interface. This digital output signal is applied to a digital-to-analogue converter 84, which converts it into a corresponding continuously variable analogue signal at output 86, usable for control purposes.

With a typical electrode spacing of 50 mm, the circuitry 74 of FIG. 3 can typically interpolate between electrodes to a resolution of about 1 mm, and provide an overall level measurement to an accuracy of about ±5 mm.

Although the circuitry 74 is described as providing an analogue output signal via the digital-to-analogue converter 84, the digital output produced by the microprocessor 82 can be directly used instead if desired. Also, although the circuitry 74 is described as separate from and co-operating with both sets of circuitry 50, circuitry similar to the circuitry 74 can be alternatively or additionally incorporated in both sets of circuitry 50 to provide increased reliability.

Finally, fluid level sensing applications other than boiler water level sensing are possible, based on impedance measurements other than simple resistance measurements.

I claim:

1. A fluid level sensing system for sensing a level of an interface between a first fluid and a second fluid, the first fluid being beneath and of lower electrical impedance than the second fluid, the system comprising an electrically conductive vessel for containing the fluids and a plurality of vertically spaced sensors including an interface sensor and at least one additional sensor positioned below the interface sensor, said interface sensor being either at the interface or immediately below the interface when none of said sensors is at the interface, wherein each of said sensors has a sensing portion which projects into and is electrically insulated from the vessel and which is arranged to produce a signal representative of the impedance of the fluid between the sensing portion and the vessel, further comprising output means responsive to said impedance-representative signals for producing a first signal which is dependent upon a ratio between an impedance sensed by the interface sensor and a value for an impedance of the first fluid derived from said additional sensor, and for combining said first signal with a second signal dependent upon the level of the interface sensor so as to produce an output signal representative of the level of said interface within the vessel.

2. A system as claimed in claim 1, wherein said at least one additional sensor comprises a plurality of additional sensors, and wherein said value for the impedance of the first fluid is derived by extrapolation from said plurality of additional sensors.

3. A system as claimed in claim 2, wherein said plurality of additional sensors comprise sensors immediately beneath the interface sensor.

4. A system as claimed in claim 1, further comprising a respective reference impedance for each sensor, and at least one reference signal source for applying an AC reference signal via each reference impedance to the sensing portion of the sensor associated with that reference impedance, whereby the reference impedance and the fluid between the sensing portion of the associated sensor and the vessel form a potential divider.

5. A system as claimed in claim 1, wherein the output means comprises at least one analog-to-digital converter for converting the impedance-representative signal derived from the interface sensor into a corresponding digital signal, and a microprocessor arranged to receive the digital signal and to produce said first signal therefrom.

6. A system as claimed in claim 5, wherein said at least one analog-to-digital converter comprises a plurality of analog-to-digital converters, and wherein a respective one of each said plurality of analog-to-digital converters is associated with each of said sensors.

7. A system as claimed in claim 5, wherein said at least one analog-to-digital converter is one analog-to-digital converter, said system further comprising multiplexing means for multiplexing the analog-to-digital converter between the sensors on a time multiplexed basis.

8. A system as claimed in claim 5, wherein said at least one analog-to-digital converter is two analog-to-digital converters, said system further comprising first multiplexing means for multiplexing one of said analog-to-digital converters between the sensors of a first group of said sensors on a time multiplexed basis, and second multiplexing means for multiplexing the other of said analog-to-digital converters between the remaining sensors on a time multiplexed basis, the sensors of the first group comprising every alternate one of the vertically spaced sensors.

9. A system as claimed in claim 5, wherein the microprocessor is further arranged to produce said second signal and to sum said second signal with said first signal to produce a resulting summed signal, the resulting summed signal being applied to a digital-to-analog converter to produce said output signal in analog form.

10. A system as claimed in claim 5, further comprising a respective reference impedance for each sensor, and at least one reference signal source for applying an AC reference signal via each reference impedance to the sensing portion of the sensor associated with that reference impedance, whereby the reference impedance and the fluid between the sensing portion of the associated sensor and the vessel form a potential divider, and whereto the reference impedances, the at least one reference signal source, the at least one analog-to-digital converter, and the microprocessor are disposed in a housing remote from the sensors.

* * * * *